United States Patent
Takemura

(10) Patent No.: US 9,319,291 B2
(45) Date of Patent: Apr. 19, 2016

(54) SERVER SYSTEM, MANAGEMENT DEVICE, SERVER MANAGEMENT METHOD, AND PROGRAM

(75) Inventor: Toshinori Takemura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 314 days.

(21) Appl. No.: 13/877,949

(22) PCT Filed: Sep. 9, 2011

(86) PCT No.: PCT/JP2011/005093
§ 371 (c)(1),
(2), (4) Date: Apr. 5, 2013

(87) PCT Pub. No.: WO2012/046386
PCT Pub. Date: Apr. 12, 2012

(65) Prior Publication Data
US 2013/0205024 A1   Aug. 8, 2013

(30) Foreign Application Priority Data
Oct. 7, 2010   (JP) ................................. 2010-227824

(51) Int. Cl.
G06F 15/173   (2006.01)
H04L 12/26   (2006.01)
G06F 11/34   (2006.01)

(52) U.S. Cl.
CPC ........ *H04L 43/0876* (2013.01); *G06F 11/3409* (2013.01); *G06F 11/3433* (2013.01); *G06F 11/3442* (2013.01); *G06F 11/3466* (2013.01); *G06F 2201/815* (2013.01); *G06F 2209/503* (2013.01); *G06F 2209/508* (2013.01)

(58) Field of Classification Search
CPC . H04L 67/1002; H04L 43/0876; H04L 43/16; H04L 67/1004; H04L 67/1023
USPC .................................. 709/224, 225, 226, 229
See application file for complete search history.

(56) References Cited

U.S. PATENT DOCUMENTS

| | | | |
|---|---|---|---|
| 8,539,075 B2 * | 9/2013 | Bali et al. ...................... | 709/226 |
| 2006/0064497 A1 * | 3/2006 | Bejerano et al. ............... | 709/228 |
| 2007/0250631 A1 * | 10/2007 | Bali et al. ...................... | 709/226 |

(Continued)

FOREIGN PATENT DOCUMENTS

| | | |
|---|---|---|
| JP | 2001-101149 A | 4/2001 |
| JP | 2002202383 A | 7/2002 |

(Continued)

OTHER PUBLICATIONS

International Search Report of PCT Application No. PCT/JP2011/005093 mailed on Nov. 29, 2011.

(Continued)

*Primary Examiner* — Liangche A Wang

(57) ABSTRACT

A server system (1) includes a management device (100) connected through a communication network (3) to plural physical servers (10) on which plural virtual servers (20) run and managing the plural virtual servers (20) running on the physical servers (10), the management device (100) including a judging unit (104) that divides a process of judging whether an available resource capacity, in a case where the virtual servers (20) run on the physical servers (10), satisfies a predetermined condition, into plural processes for every predetermined unit of time, and performs the processes of judging through parallel distributed processing.

9 Claims, 13 Drawing Sheets

(56) References Cited

U.S. PATENT DOCUMENTS

| | | | |
|---|---|---|---|
| 2008/0082647 A1* | 4/2008 | Baker | 709/223 |
| 2009/0220238 A1* | 9/2009 | Wang et al. | 398/79 |
| 2010/0161805 A1* | 6/2010 | Yoshizawa et al. | 709/226 |

FOREIGN PATENT DOCUMENTS

| | | |
|---|---|---|
| JP | 2005115653 A | 4/2005 |
| JP | 2006-228115 A | 8/2006 |
| JP | 2008-217302 A | 9/2008 |
| JP | 2008-276320 A | 11/2008 |
| JP | 2008293117 A | 12/2008 |
| JP | 2009-134687 A | 6/2009 |

OTHER PUBLICATIONS

Japanese Office Action for JP Application No. 2012-537560 mailed on Sep. 29, 2015 with English Translation.

* cited by examiner

FIG. 5

TABLE 1

| STEP NUMBER | DATA FORMAT |
|---|---|
| S201 | 2010/05/27 13:05:02 PM1 VM11 CPU 32%, NW send 253Mbps, ... |
| S203 | <PM_ID+t, load_info_1(VM_ID+CPU+NW_send+...)> |
| S205 | <ΔT, load_info_2(LIST OF PM_ID+t+load_info_1)> |
| S207, S209 | <ΔT, result_2(PM_ID, VM_ID, OK/NG, SURPLUS RESOURCE)> |
| S211, S213 | <PM_ID+VM_ID, result_1(OK/NG, SURPLUS RESOURCE)> |

FIG. 8

TABLE 2

| STEP NUMBER | DATA FORMAT |
|---|---|
| S201 | 2010/05/27 13:05:02 PM1 VM11 CPU 32%, NW send 253M bps, ... |
| S203 | <PM_ID+t, load_info_1(VM_ID+CPU+NW_send +...)> |
| S205 | <ΔT, load_info_2(LIST OF PM_ID+t+load_info_1)> |
| S303 | <ΔTmin, load_info_3(LIST OF load_info_2)> |
| S305, S307 | <ΔTmin, result_3(PM_ID, VM_ID, OK/NG, SURPLUS RESOURCE)> |
| S207, S209 | <ΔT, result_2(PM_ID, VM_ID, OK/NG, SURPLUS RESOURCE)> |
| S211, S213 | <PM_ID+VM_ID, result_1(OK/NG, SURPLUS RESOURCE)> |

FIG. 11

TABLE 3

| STEP NUMBER | DATA FORMAT |
|---|---|
| S201 | 2010/05/27 13:05:02 PM1 VM11 CPU 32%, NW send 253Mbps, ... |
| S203 | <PM_ID+t, load_info_1(VM_ID+CPU+NW_send+...)> |
| S205 | <ΔT, load_info_2(LIST OF PM_ID+t+load_info_1)> |
| S303 | <ΔTmin, load_info_3(LIST OF load_info_2)> |
| S403 | <ΔL, load_info_4(LIST OF load_info_2)> |
| S405 | <ΔTmin, load_info_5(LIST OF load_info_2)> |
| S305, S307 | <ΔTmin, result_3(PM_ID, VM_ID, OK/NG, SURPLUS RESOURCE)> |
| S207, S209 | <ΔT, result_2(PM_ID, VM_ID, OK/NG, SURPLUS RESOURCE)> |
| S211, S213 | <PM_ID+VM_ID, result_1(OK/NG, SURPLUS RESOURCE)> |

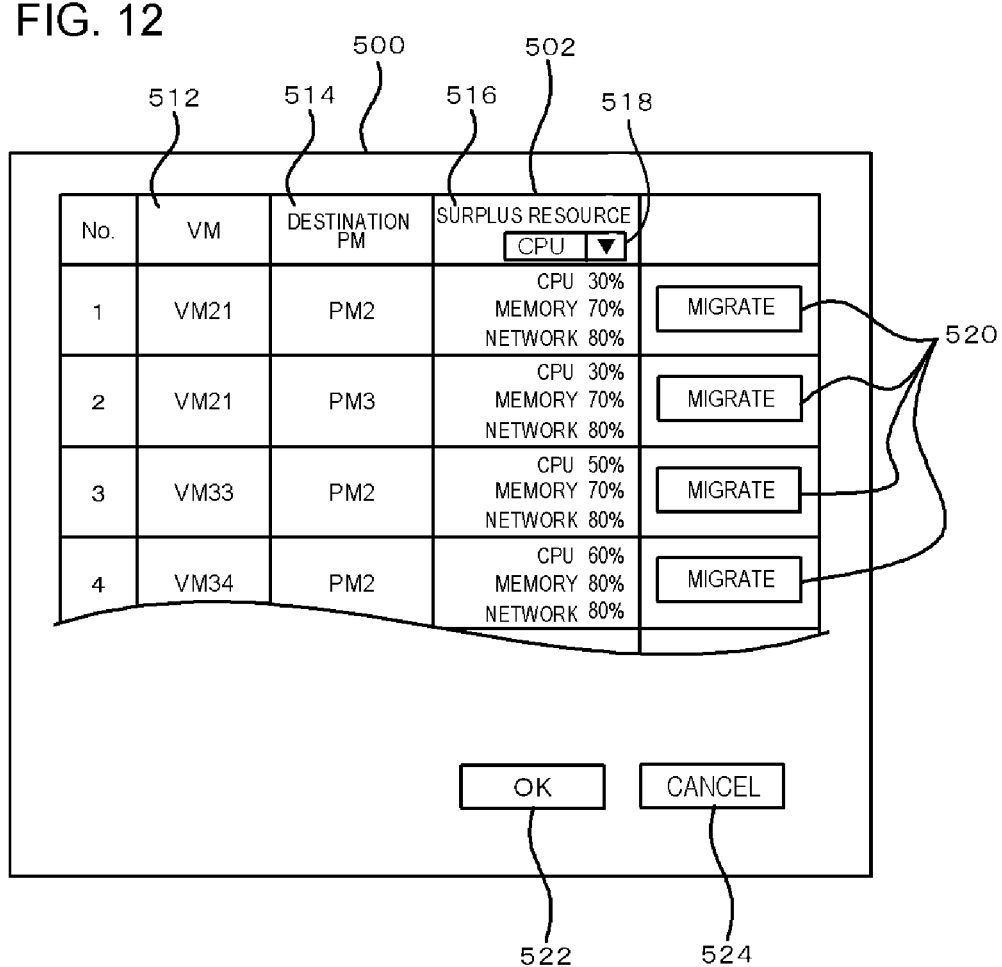

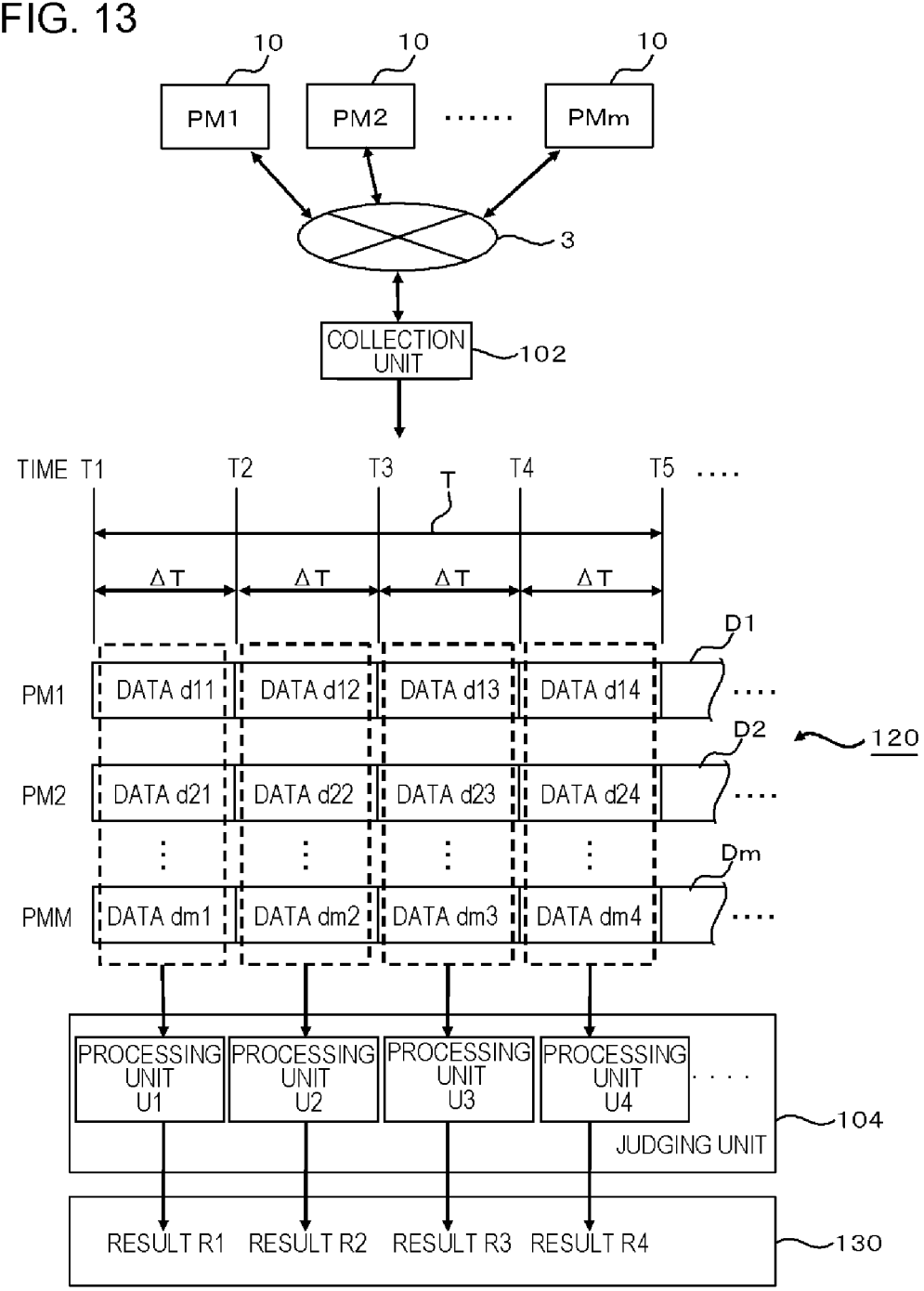

SERVER SYSTEM, MANAGEMENT DEVICE, SERVER MANAGEMENT METHOD, AND PROGRAM

This application is a National Stage Entry of PCT/JP2011/005093 filed Sep. 9, 2011, which claims priority from Japanese Patent Application 2010-227824 filed Oct. 7, 2010, the contents of all of which are incorporated herein by reference, in their entirety.

TECHNICAL FIELD

The present invention relates to a server system, a management device, a server management method, and a program, and in particular, to a server system, a management device, a server management method, and a program, in which plural virtual servers run on plural physical servers.

BACKGROUND ART

In recent years, server virtualization technology has been used to configure plural virtual servers on one physical server with software, and simultaneously perform plural processes in the plural virtual servers. With this server virtualization technology, it is possible to establish a system for simultaneously running plural virtual servers on plural physical servers connected through a communication network.

For the virtual server system having plural virtual servers running on the plural physical servers as described above, there has been known a technique in which processing performances of available resources in the physical servers are dynamically measured to compare processing performances of the individual virtual servers running on physical servers having difference performances.

For example, Patent Document 1 describes that, in a virtual server environment having virtual servers running on plural physical servers, an available capacity of a physical server serving as a migration destination of the virtual server is estimated.

RELATED DOCUMENT

Patent Document

Patent Document 1: Japanese Patent Application Laid-open No. 2009-134687

SUMMARY OF THE INVENTION

However, with the system described in Patent Document 1, only the availability of the capacity for values of load at a certain point in time is determined, and it is not examined whether or not sufficient capacity can be obtained for load data in a certain period of time that periodically changes with time depending on the contents of processing. Further, checking the capacity for the load data in a predetermined period of time leads to an increase in the amount of load data, which enormously increases the volumes of data. Thus, it takes a long time to perform a calculation for judging the capacity.

An object of the present invention is to provide a server system, a management device, a server management method, and a program capable of solving the problems described above.

A server system according to the present invention includes plural physical servers on which plural virtual servers run, and a management device which is connected through a communication network to the plural physical servers and manages the virtual servers running on the physical servers, in which the management device includes a judging unit that divides a process of judging whether an available resource capacity, in a case where the virtual servers run on the physical servers, satisfies a predetermined condition, into plural processes for every predetermined unit of time, and performs the processes of judging through parallel distributed processing.

A management device according to the present invention is connected through a communication network to plural physical servers on which plural virtual servers run, and includes a judging unit that divides a process of judging whether or not an available resource capacity, in a case where the virtual servers run on the physical servers, satisfies a predetermined condition, into plural processes for every predetermined unit of time, and performs the processes of judging through parallel distributed processing.

A method for managing a server according to the present invention is performed by a management device connected through a communication network to plural physical servers on which plural virtual servers run, the management device further managing the virtual servers running on the physical servers, the method including dividing a process of judging whether or not an available resource capacity, in a case where the virtual servers run on the physical servers, satisfies a predetermined condition, into plural processes for every predetermined unit of time, and performing the processes of judging through parallel distributed processing.

A program according to the present invention provides a program for causing a computer that realizes a management device connected through a communication network to plural physical servers on which plural virtual servers run and managing the virtual servers running on the physical servers, to perform a procedure for dividing a process of judging whether or not an available resource capacity, in the case where the virtual servers run on the physical servers, satisfies a predetermined condition, into plural processes for every predetermined unit of time, and performing the processes of judging through parallel distributed processing.

It should be noted that any combinations of the above-described constituent elements, and conversions of ways of expressing the present invention between a method, a device, a system, a recording medium, a computer program, or the like are also effective as an aspect of the present invention.

Various kinds of constituent elements of the present invention may not necessarily exist independently from each other, and may be in the following manner: a plurality of constituent elements may be formed as one member, one constituent element may be formed with a plurality of members, a certain constituent element may be a part of another constituent element, or a part of a certain constituent element may overlap a part of another constituent element.

Further, the method and the computer program of the present invention are described such that a plurality of procedures are described in order, but the order of the description is not intended to limit the order of execution of a plurality of procedures. Accordingly, when the method and the computer program of the present invention are carried out, the order of a plurality of procedures may be changed within the scope not causing any problem in terms of the contents.

Further, the order of a plurality of procedures of the method and the computer program of the present invention is not limited to execution with timing different from each other. For this reason, for example, another procedure may occur during execution of a certain procedure, and execution timing of a certain procedure may partially or entirely overlap execution timing of another procedure.

According to the present invention, it is possible to provide a server system, a management device, a server management method, and a program capable of quickly managing resources of a physical server at the time of running a virtual server with reduced load.

BRIEF DESCRIPTION OF THE DRAWING

The above-described object and other objects of the present invention, and features and advantages of the present invention will be made further clear by the preferred exemplary embodiment described below and the following drawings attached thereto.

FIG. 5 is a diagram illustrating a table serving as an example of a data format treated in a series of processes performed in the server system according to the exemplary embodiment of the present invention.

FIG. 8 is a diagram illustrating a table serving as an example of a data format treated in a series of processes performed in the server system according to the exemplary embodiment of the present invention.

FIG. 11 is a diagram illustrating a table serving as an example of a data format treated in a series of processes performed in a management device in the server system according to the exemplary embodiment of the present invention.

FIG. 12 is a diagram illustrating an example of a screen in the management device in the server system according to the exemplary embodiment of the present invention.

FIG. 13 is a diagram for explaining parallel distributed processing in the server system according to the exemplary embodiment of the present invention.

DESCRIPTION OF EMBODIMENTS

Figure 1:
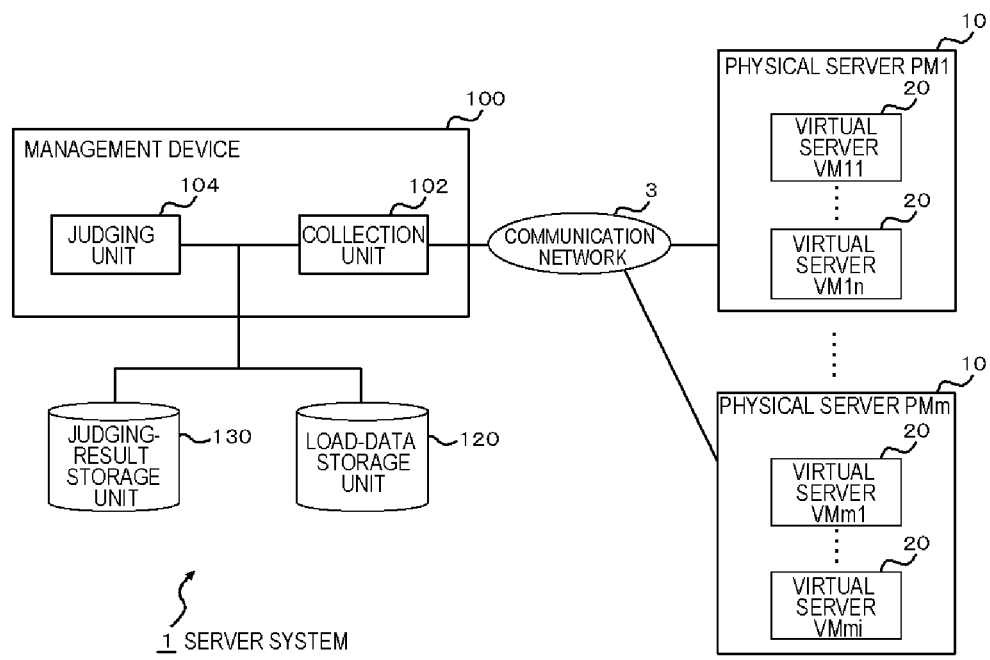
FIG. 1 is a functional block diagram illustrating a configuration of a server system according to an exemplary embodiment of the present invention.

Hereinbelow, an exemplary embodiment of the present invention will be described with reference to the drawings. Note that, in all the drawings, the same constituent components are denoted by the same reference numerals, and detailed explanation thereof will not be repeated.

First Exemplary Embodiment

FIG. 1 is a functional block diagram illustrating a configuration of a server system 1 according to an exemplary embodiment of the present invention.

The server system 1 according to the exemplary embodiment of the present invention includes plural physical servers 10 on which plural virtual servers 20 run, and a management device 100 that is connected to the plural physical servers 10 through a communication network 3 and that manages the virtual servers 20 running on the physical servers 10. The management device 100 includes a judging unit 104 that divides a process of judging whether or not an available resource capacity of the physical servers 10, in the case where the virtual servers 20 run on the physical servers 10, satisfies a predetermined condition, into plural processes for every predetermined unit of time, and performs the processes of judging through parallel distributed processing. In FIG. 1, virtual servers running on a physical server PM1 are denoted by reference characters VM11, . . . , VM1$n$ ($n$ is a natural number), and virtual servers running on a physical server PMm are denoted by reference characters VMm1, . . . , VMmi (m and i are natural numbers). In the following description, the servers are separately specified using the reference characters as described below.

Each of constituent elements of the server system 1 illustrated in FIG. 1 is achieved with any combination of software and hardware of a computer including a central processing unit (CPU), a memory, a program achieving constituent elements of this drawing loaded to the memory, the storage device such as a hard disk storing the program, and a network connection interface. Skilled persons in the field would understand that there are various modification examples of the method or device for realizing the constituent elements or device. In the drawings below, functional blocks are illustrated rather than blocks based on hardware.

Further, in the drawings described below, configurations that are not essential for the present invention are omitted, and are not illustrated.

The management device 100 can be realized by a server computer, personal computer or other corresponding device including, for example, a CPU, a memory, a hard disk, and a communication device, which are not illustrated, and connected to an input device such as a keyboard and a mouse, and an output device such as a display and a printer. Further, the CPU reads out a program stored in the hard disk into the memory and runs the program, thereby realizing each function of the units described above.

A computer program according to this exemplary embodiment is designed so as to cause the computer for realizing the management device 100 to perform a procedure for dividing a process of judging whether or not the available resource capacity of each of the physical servers 10 at the time when the virtual servers 20 run on each of the physical servers 10 satisfies a predetermined condition, into plural processes for every predetermined unit of time, thereby performing the processes of judging through parallel distributed processing.

The computer program according to this exemplary embodiment may be recorded in a computer-readable recording medium (magnetic disk, semiconductor memory, optical disk, or the like). There is not any specific limitation on the storage medium, and various storage media may be used. Further, the program may be loaded in a memory in the computer from a recording medium, or may be downloaded through a network to the computer and be loaded in the memory.

In the server system 1 according to this exemplary embodiment, the management device 100 may perform controls such as monitoring resources of the physical servers 10 and the virtual servers 20, each of which performs business-oriented applications, and migrating the virtual server 20 to other physical servers as needed. At this time, the management device 100 according to this exemplary embodiment performs a judging process of finding a combination of the physical server 10 and the virtual server 20 that can efficiently utilize the resources.

In this exemplary embodiment, the physical server 10 is an actual computer formed by hardware, and can be realized by a server computer, a personal computer or other corresponding device including a CPU, a memory, a hard disk, and a communication controlling device, which are not illustrated, and connected to an input device such as a keyboard and a mouse, and an output device such as a display and a printer. Further, the CPU reads a program stored on the hard disk into the memory and runs the program, thereby realizing each function of the units described above.

The virtual server 20 is a virtual computer configured on the physical server 10 by virtualization software. Plural virtual servers 20 can be run on the physical server 10. This enables plural users to use one physical server 10 at the same time, or different operating systems to run in parallel.

In FIG. 1, the management device 100 is a computer different from the physical servers 10. However, the management device 100 may be realized by a computer on which the physical server 10 or virtual server 20 runs.

In this exemplary embodiment, the server system 1 manages a system including plural physical servers 10 on which plural virtual servers 20 run, and includes a data center or other large system having a large number of information technology devices. Thus, the combination of the physical servers 10 and the virtual servers 20 significantly increases, and the calculation time for determining the physical server 10 to which the virtual servers 20 are migrated increases, which results in a problem such as an increase in the processing load. In view of the circumstances described above, in the server system 1 according to this exemplary embodiment of the present invention, the judging process is divided into plural processes for every predetermined unit of time, and is performed though parallel distributed processing, whereby it is possible to deal with the data center as described above or other large system including a large number of information technology devices.

Further, in the server system 1 according to the exemplary embodiment of the present invention, the management device 100 monitors load data of the physical servers 10 and the virtual servers 20 that have the load data with periodically appearing peaks, which makes it possible to efficiently utilize the resources.

For example, web servers in a company have a periodic load on a daily basis in which the load becomes high at the beginning and the ending of working time and during lunchtime. Further, a salary calculation system or attendance management system in a company performs data processing on a monthly basis, and has a periodic load on a monthly basis in which the peak of server loads comes at the start or end of every month, and the load is low during the rest of the time. As described above, the load of the virtual servers running on the physical servers changes with time depending on the contents being processed. Thus, the management device 100 according to this exemplary embodiment performs control so as to be able to efficiently utilize the resources even in the case where the load peaks of the load data periodically appear and the load changes in a certain period of time.

The peaks of the load of the physical server 10 and the virtual server 20 serving as the monitoring targets periodically appear in a time span (hereinafter, referred to as "time span T"), for example, daily, weekly, monthly, yearly, on a day-of-week basis, on a seasonal basis, on a half-yearly basis, and so on. Further, a unit of time ΔT for the dividing process includes an hour, a date, a week, a month, a year, or the like.

Further, the resource may include a CPU, a memory, a network I/O (input/output), and a storage I/O of the physical server 10 or virtual server 20.

More specifically, the server system 1 includes the management device 100 including a collection unit 102 and the judging unit 104, a load-data storage unit 120 connected to the management device 100, and a judging-result storage unit 130.

It should be noted that the load-data storage unit 120 and the judging-result storage unit 130 may be included in the management device 100.

The collection unit 102 acquires values of the load data of the physical servers 10 and the virtual servers 20 at certain intervals through the communication network 3 from the physical servers 10 and the virtual servers 20, and stores them as historical data in the load-data storage unit 120. The load data collected by the collection unit 102 include information concerning a CPU usage rate and a memory usage rate of respective physical servers 10 and virtual servers 20, input-output performance values of a recording medium such as a ratio of an input-output data transmitting rate relative to the maximum data transmitting rate, and an input-output performance value of a communication controlling device such as a transmission rate and a usage band.

The load-data storage unit 120 stores the load data collected by the collection unit 102. The load-data storage unit 120 may store, for each of the physical servers 10, the load data of each of the virtual servers 20 running on each corresponding physical server 10 in a manner such that each of the load data is paired with each of the collection times t.

The judging unit 104 judges a containability of the virtual servers 20 running on the physical servers 10 on the basis of the load data collected by the collection unit 102. In this exemplary embodiment, the judging unit 104 divides, according to each time zone, the load data concerning the physical servers 10 and the virtual servers 20 running on the physical servers 10 and collected by the collection unit 102, and judges the containability. Further, the judging unit 104 stores the judging results of the containability in the judging-result storage unit 130.

Next, the parallel distributed processing for the judging process performed by the judging unit 104 will be described below.

For example, as illustrated in FIG. 13, load data D1, D2, . . . , Dm collected by the collection unit 102 through the communication network 3 from plural physical servers 10 (PM1, PM2, . . . , PMm) are first stored in the load-data storage unit 120. Then, a predetermined time span T is divided into plural units of time ΔT, and for each of the units of time ΔT, the load data are divided, for example, into data d11, d21, . . . , dm1 between time t1 and time t2, and data d12, d22, . . . , dm2 between time t2 and time t3. Note that, in this drawing, the time span T is divided into four units of time ΔT. However, the number of division is set for the purpose of explanation, and is not limited to this. Then, in the judging unit 104, plural processing units U1, U2, U3, . . . , distributedly process, in parallel, the divided data on the plural physical servers 10 (PM1, PM2, . . . , PMm), this divided data being divided for each of the units of time ΔT. Then, plural results R1, R2, R3, . . . processed by the processing units are stored into the judging-result storage unit 130.

For example, in FIG. 13, the processing unit U1 in the judging unit 104 processes the data d11, d21, . . . , dm1 on the physical servers PM1, PM2, . . . , PMm between the time t1 and the time t2, and the results R1 are stored in the judging-result storage unit 130. The processing unit U2 of the judging unit 104 processes the data d12, d22, ..., dm2 on the physical servers PM1, PM2, ..., PMm between the time t2 and the time t3, and the results R2 are stored in the judging-result storage unit 130. As described above, the judging process is performed through the parallel distributed processing by the judging unit 104 of the management device 104 according to the present invention.

In FIG. 1, in this exemplary embodiment, the judging unit 104 judges whether or not a virtual server 20 having periodic load peaks can be operated in a time zone in a certain interval, for example, in 24 hours, using the available resource on a physical server 10, and provides the judging results as the containability of a physical server 10 for a certain virtual server 20.

In this specification, the expression "judging the containability" means judging whether or not, in the case where a physical server 10 is to run a new virtual server 20 in a state where 0 or more virtual servers 20 have been running on a physical server 10, processes can be completed without causing any insufficient capacity in the resources such as the CPU, the memory, the network I/O and the storage I/O throughout a certain period of time, the period of time being defined as a unit of time in which the load of the virtual server 20 has a periodicity.

However, in other exemplary embodiments, it may be possible to judge whether or not the processes can be completed within a certain period of time having a periodicity, without causing any insufficient capacity in one or more predetermined resources of the CPU, the memory, the network I/O, and the storage I/O.

More specifically, the containability is judged to be available (OK) if the available resource on the physical server 10 is more than or equal to the amount necessary to operate the virtual server 20, whereas the containability is judged to be not available (NG) if the available resource on the physical server 10 is less than the amount necessary to operate the virtual server 20.

The judging-result storage unit 130 stores "OK" or "NG" as the judging result of the containability made by the judging unit 104. In this exemplary embodiment, the judging result is expressed as "OK" or "NG" for the purpose of convenience. However, the expression is not limited to these. It may be possible to employ numerals, characters, flags or other various manners as the information indicating the judging result.

Described below are the operations of the server system 1 according to this exemplary embodiment having the configuration as described above.

Figure 2:
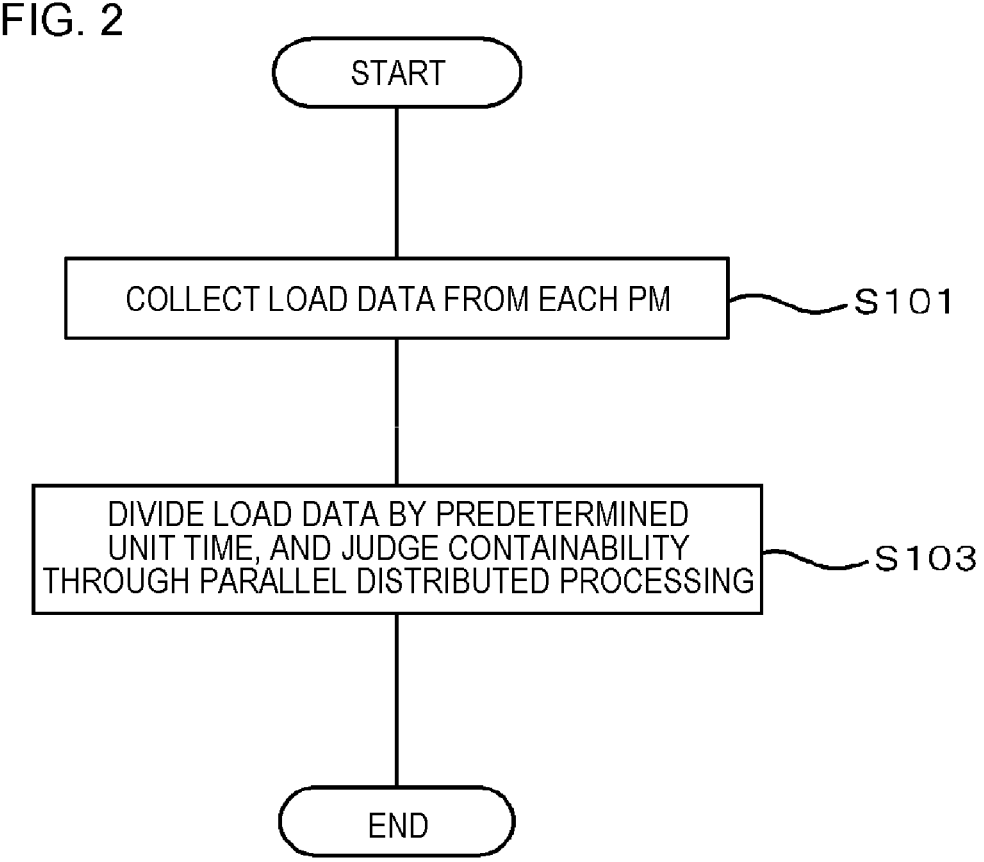
FIG. 2 is a flowchart showing an example of an operation of the server system according to the exemplary embodiment of the present invention.

FIG. 2 is a flowchart showing an example of an operation performed by the server system 1 according to the exemplary embodiment of the present invention. Below, a description will be made with reference to FIG. 1 and FIG. 2.

With a method for managing a server according to this exemplary embodiment of the present invention, the management device 100 divides a process of judging whether or not the available resource capacity of each of the physical servers, in the case where the virtual servers run on the physical servers, satisfies predetermined conditions, into plural processes for every predetermined unit of time, and perform the processes of judging through the parallel distributed processing (step S103).

More specifically, the collection unit 102 first collects the load data of the physical server 10 and the virtual servers 20 from each of the physical servers 10, and stores the collected load data in the load-data storage unit 120 (step S101). Then, the judging unit 104 refers to the load-data storage unit 120, and divides the stored load data by the predetermined unit of time. Then, through the parallel distributed processing, each containability is judged, and the judging results are stored in the judging-result storage unit 130 (step S103).

The server system 1 according to this exemplary embodiment may include a presenting unit (not illustrated) that provides the judging results of the containability stored in the judging-result storage unit 130 as described above and concerning the case where the virtual servers 20 run on each of the physical servers 10 in a manner that an operator can view the judging results as needed. For example, the judging results may be displayed on a screen of an output device (not illustrated) such as a display, or may be printed out from an output device (not illustrated) such as a printer.

The server system 1 according to this exemplary embodiment may include a processing unit (not illustrated) that displays, on the display, an operation screen through which the operator searches for the judging results of the containability using an input device (not illustrated) such as a keyboard, receives the operation made by the operator, and performs the searching process.

With the configuration as described above, it is possible for the operator to quickly select a physical server 10 suitable as the migration destination of the virtual server 20. Note that the judging results of all the physical servers may be provided in the form of a list. Further, the list may be formed in a manner that the judging results are sorted into OK and Not Acceptable. Yet further, the list may be provided so as to include, for example, other performance information (for example, CPU performance and capacity of memory) of the physical servers.

According to the present invention, the load data of the physical server 10 or virtual server 20 occurring in the case where the virtual server 20 is migrated to the physical server 10 to be operated are divided by the time zone for each of the combinations of the physical server 10 and the virtual server 20, and the judging processes are performed for the containability, whereby it is possible to perform the parallel distributed processing. Thus, with the present invention, it is possible to select the physical server 10 suitable for the migration destination of the virtual server 20 for short periods of time with lower load. As described above, according to the present invention, it is possible to manage the resources of the physical servers at the time of running the virtual servers for short periods of time with the lower load. Further, according to the present invention, it is possible to avoid occurrence of insufficient capacity or excess available resource of the virtual servers 20, thereby efficiently utilizing the resources.

According to the present invention, it is possible to quickly examine whether or not sufficient capacity necessary for operating the virtual server 20 is secured in particular for the load data having a periodicity in a certain period of time. This is because the containability can be judged for the entire periodic load data of the virtual servers.

Yet further, according to the server system 1 of the present invention, it is possible to provide an effect of quickly judging the physical server having the capacity sufficient for operating the virtual servers even if the number of the physical server or virtual server increases. With this effect, it is possible to avoid occurrence of the insufficient capacity of the virtual server or excess available resource. This is because the judging processes of the containability are configured as processes that can be performed in a parallel distributed manner.

Second Exemplary Embodiment

Figure 3:
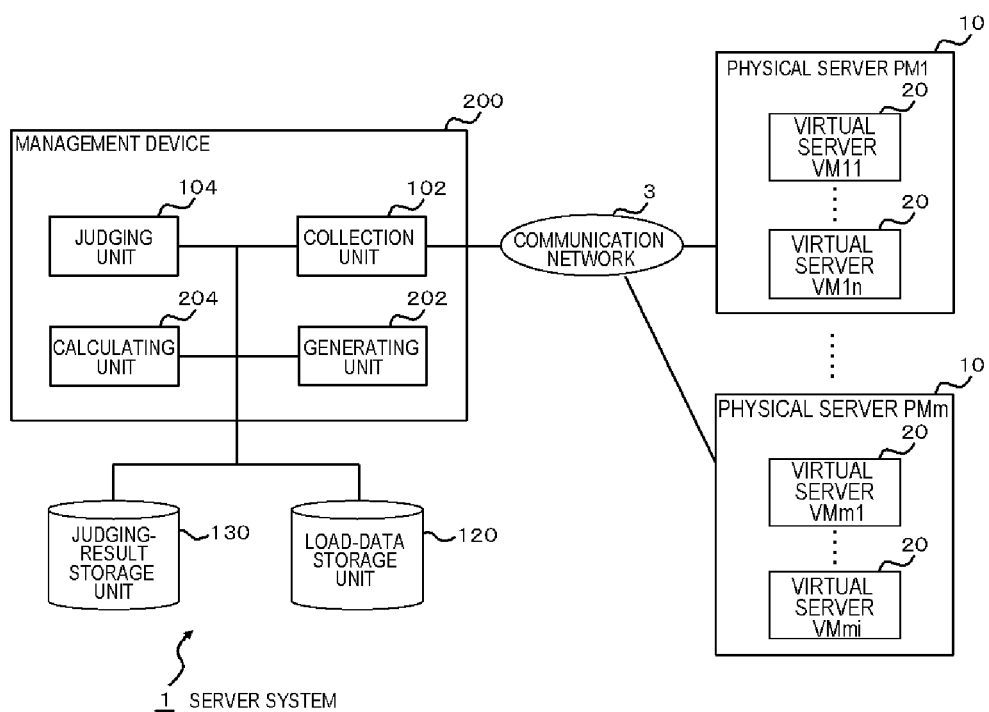
FIG. 3 is a functional block diagram illustrating a configuration of a server system according to the exemplary embodiment of the present invention.

FIG. 3 is a functional block diagram illustrating a configuration of a server system 1 according to this exemplary embodiment of the present invention.

The management device 200 of the server system 1 according to this exemplary embodiment includes a specific configuration for performing processing on the basis of the load data collected by the collection unit 102 in the management device 100 according to the exemplary embodiment described above.

It should be noted that, in this exemplary embodiment, a description will be made of an example in which the server system 1 dose not have a large number of the physical servers 10 and the virtual servers 20, and the load data has a middle size (number of the load data serving as the monitoring target).

In the server system 1 according to the exemplary embodiment of the present invention, the management device 200 further includes a generating unit 202 and a calculating unit 204 in addition to the configuration of the management device 100 in the above-described exemplary embodiment illustrated in FIG. 1.

The generating unit 202 first generates paired data having an identifier (PM_ID) for each of the physical servers 10 and a collection time t as a key and the load data as a value, on the basis of the load data of the physical servers 10 and the virtual servers 20 collected by the collection unit 102 from each of the physical servers 10. Then, the generating unit 202 generates paired data having the unit of time ΔT for the dividing process as the key and a log at the time t included in the unit of time as the value.

Each of the above-described data generated by the generating unit 202 can be stored in the load-data storage unit 120.

For all the ΔT contained in the time span T, the calculating unit 204 calculates a surplus resource amount of the physical server 10 at the time of operating the virtual server 20.

Next, a description will be made of operations of the management device 200 in the server system 1 according to this exemplary embodiment having a configuration as described above.

Figure 4:
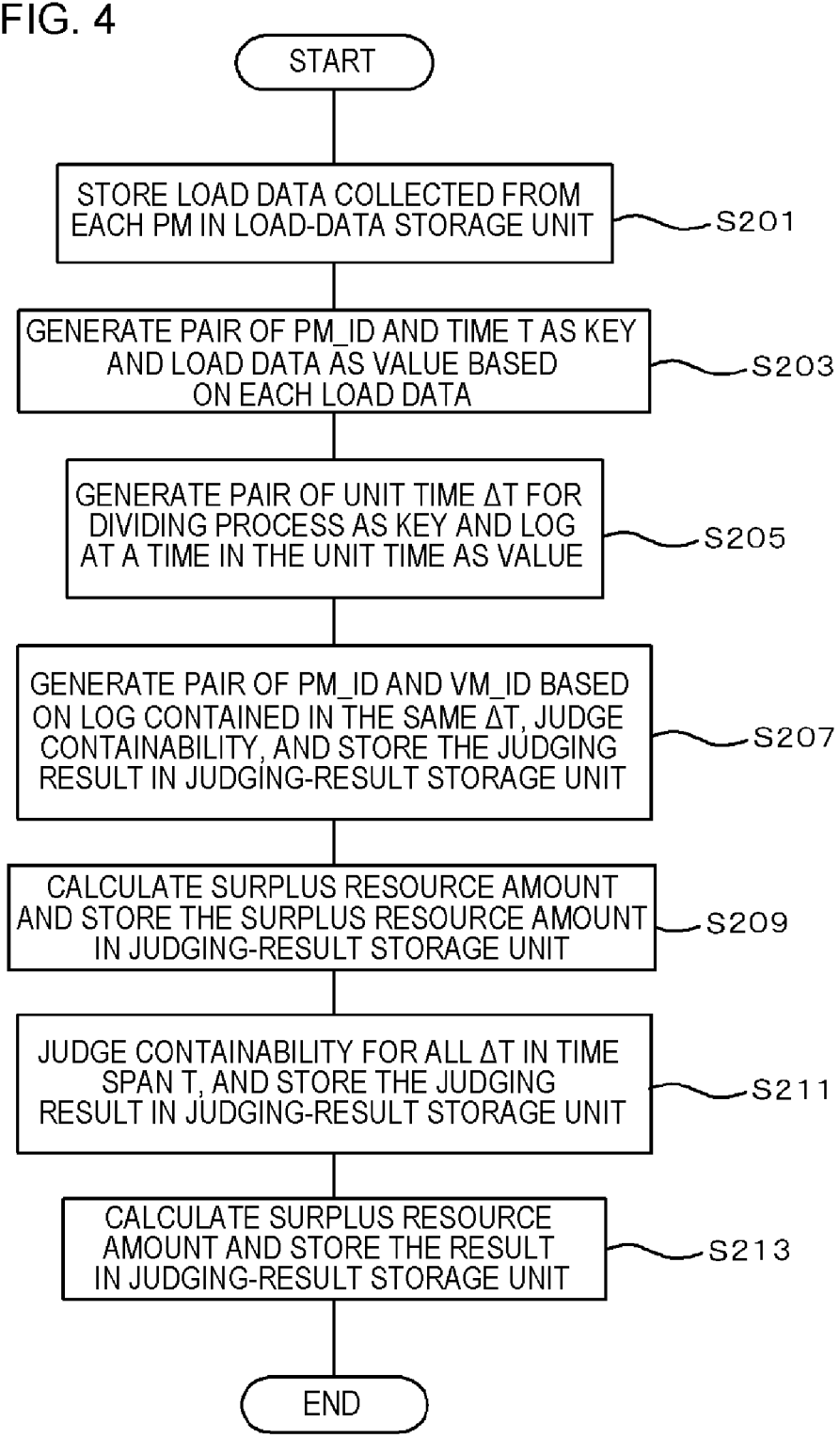
FIG. 4 is a flowchart showing an example of an operation of the server system according to the exemplary embodiment of the present invention.

FIG. 4 is a flowchart showing an example of an operation performed by the server system 1 according to the exemplary embodiment of the present invention. Further, FIG. 5 is a diagram illustrating a list given as an example of a data format used in a series of processes performed in the server system 1. Next, a description will be made with reference to FIG. 3 to FIG. 5.

First, the collection unit 102 of the management device 200 acquires the load data of each of the physical servers 10 through the communication network 3 at a constant interval, and stores the acquired load data in the load-data storage unit 120 (step S201). The data format at this time is a data format as shown in step S201 in Table 1 shown in FIG. 5. As illustrated in FIG. 5, the load data includes, for example, a collection time t (2010/05/27 13:05:02), identification information (PM1, VM11) of the physical server 10 and the virtual server 20, a CPU utilization rate (CPU 32%) of the virtual server 20, and a network input-output performance value (NW send 253 Mbps).

The generating unit 202 of the management device 200 refers to the load-data storage unit 120, and generates, on the basis of the load data, paired data having an identifier (PM_ID) for each of the physical servers 10 and a time t as the key and the load data (shown as "load_info_1(VM_ID+ CPU+NW_send+ . . . " in Table 1 in FIG. 5) as the value (step S203). The data format at this time is a data format as shown in step S203 in Table 1 shown in FIG. 5.

Further, the generating unit 202 of the management device 200 refers to the load-data storage unit 120, and generates paired data having the unit of time ΔT for the dividing process as the key and the log(shown as "load_info_2(list of PM_ID+ t+load_info_1)" in Table 1 in FIG. 5) at the time t included in the unit of time as the value (step S205). The data format at this time is a data format as shown in step S205 in Table 1 shown in FIG. 5.

The judging unit 104 of the management device 200 refers to the load-data storage unit 120, and generates paired data having PM_ID and the identifier (VM_ID) of the virtual server as a pair on the basis of the log included in the same ΔT, thereby judging the containability. Then, the judging unit 104 of the management device 200 stores the judging results (corresponding to "result_2(PM_ID, VM_ID, OK/NG)" in Table 1 shown in FIG. 5) in the judging-result storage unit 130 (step S207). Further, the calculating unit 204 of the management device 200 refers to the load-data storage unit 120, calculates the surplus resource amount (corresponding to "result_2(PM_ID, VM_ID, surplus resource)" in Table 1 shown in FIG. 5), and stores the calculated surplus resource amount in the judging-result storage unit 130 (step S209). The data format at this time is a data format as shown in step S207 and step S209 in Table 1 shown in FIG. 5.

The judging unit 104 of the management device 200 refers to the judging-result storage unit 130, and judges the containability for all the ΔT included in the time span T. The judging unit 104 of the management device 200 stores, in the judging-result storage unit 130, the judging results (corresponding to "result_1(OK/NG)" in Table 1 shown in FIG. 5) corresponding to the paired data having PM_ID and VM_ID (step S211). Then, the calculating unit 204 of the management device 200 refers to the judging-result storage unit 130, calculates the surplus resource of the physical server 10 (corresponding to "result_1(surplus resource)" in Table 1 shown in FIG. 5) corresponding to the paired data having PM_ID and VM_ID, and stores the calculated surplus resource in the judging-result storage unit 130 (step S213). The data format at this time is a data format as shown in step S211 and S213 in Table 1 shown in FIG. 5.

As described above, it is possible to present an operator with the judging results of the containability stored in the judging-result storage unit 130 and concerning the case where the virtual servers 20 operate on each of the physical servers 10, by receiving a searching request from the operator and providing the operator with the searching result, as in the above-described exemplary embodiment.

This enables the operator to quickly select a physical server 10 suitable as the migration destination of the virtual server 20. Further, the surplus resource amount is presented in a comparable manner, which makes it possible for the operator to quickly select a physical server 10 with less waste.

According to the server system 1 of this exemplary embodiment, it is possible to provide an effect similar to the previous exemplary embodiment.

Third Exemplary Embodiment

Figure 6:
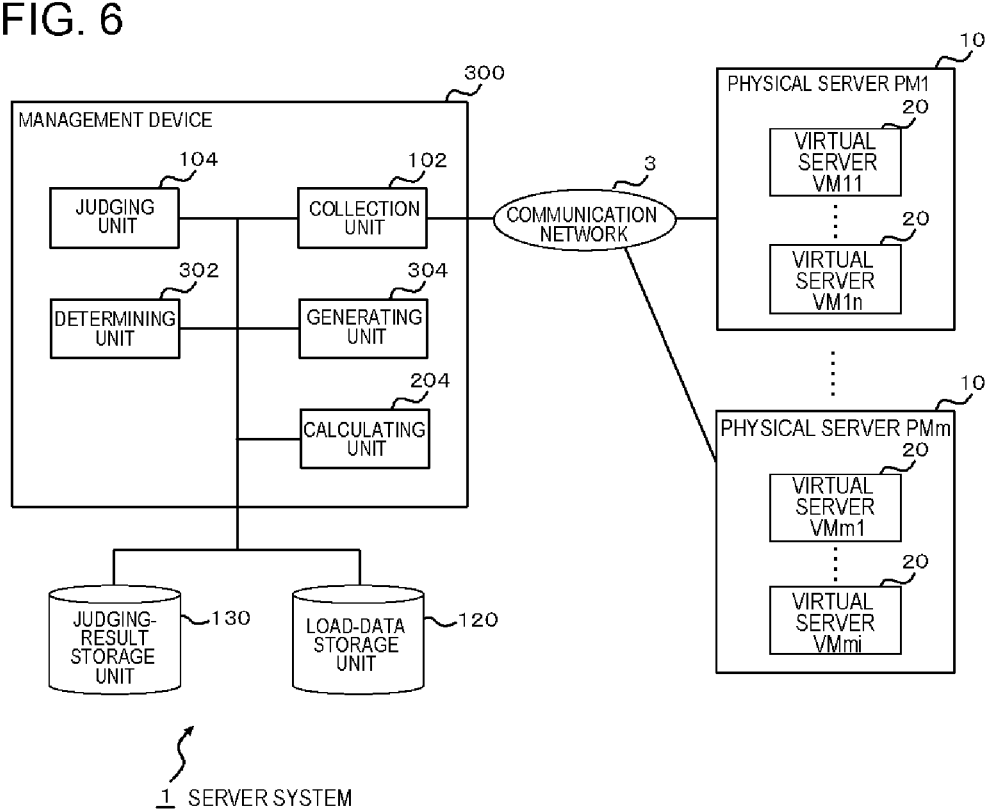
FIG. 6 is a functional block diagram illustrating a configuration of the server system according to the exemplary embodiment of the present invention.

FIG. 6 is a functional block diagram illustrating a configuration of a server system 1 according to this exemplary embodiment of the present invention.

A management device 300 of the server system 1 according to this exemplary embodiment is different from that in the exemplary embodiment illustrated in FIG. 3 in that, in the case where the number of the load data items is large, the load of the judging process is reduced by reducing the unit of time for the processes divided in the judging unit 104.

In the server system 1 according to the exemplary embodiment of the present invention, the management device 300 further includes a determining unit 302 that determines the minimum value of a unit of time such that the number of the load data processed within the unit of time is less than a predetermined value, in addition to the configuration of the management device 200 according to this exemplary embodiment illustrated in FIG. 3. Further, the judging unit 104 of the management device 300 divides the unit of time to be the determined minimum value, and performs the judging processes with the minimum value of the unit of time.

It should be noted that, in this exemplary embodiment, a description will be made of a case where the server system 1 includes a large number of the physical servers 10 and the virtual servers 20, and the volume of the size of the load data (the number of the load data items serving as the monitoring target) is large.

More specifically, the management device 300 according to this exemplary embodiment includes a generating unit 304 in place of the generating unit 202 in the management device 200 according to the above-described exemplary embodiment illustrated in FIG. 3, includes a collection unit 102, a judging unit 104, and a calculating unit 204 similar to those in the management device 200, and further includes a determining unit 302.

The determining unit 302 can determine the minimum value of the unit of time such that the number of pairs of the physical server 10 and the virtual server 20 corresponding to the load data processed in a unit of time is less than a predetermined number within the unit of time. It is preferable to use this process by the determining unit 302 in the case where the number of load data collected by the collection unit 102 and processed per unit of time is large and the load of the judging process is higher than a predetermined value.

As with the generating unit 202 in the management device 200 according to the above-described exemplary embodiment illustrated in FIG. 3, the generating unit 304 generates paired data each having an identifier (PM_ID) for each of the physical servers 10 and a collection time t as a key and load data as a value on the basis of the load data of the physical server 10 and the virtual servers 20 collected by the collection unit 102 from each of the physical servers 10. Further, the generating unit 202 generates paired data having a unit of time ΔT for the dividing process as the key and the log at the time t in the unit of time as the value.

Further, the generating unit 304 generates paired data having a minimum value ΔTmin of the unit of time ΔT as the key and the log at the time t in the unit of time as the value in the case where the number of the pairs of the generated data is larger than a predetermined value.

Each of the data generated by the generating unit 304 may be stored in the load-data storage unit 120.

Described below are the operations performed by the management device 300 in the server system 1 according to this exemplary embodiment having the configuration as described above.

Figure 7:
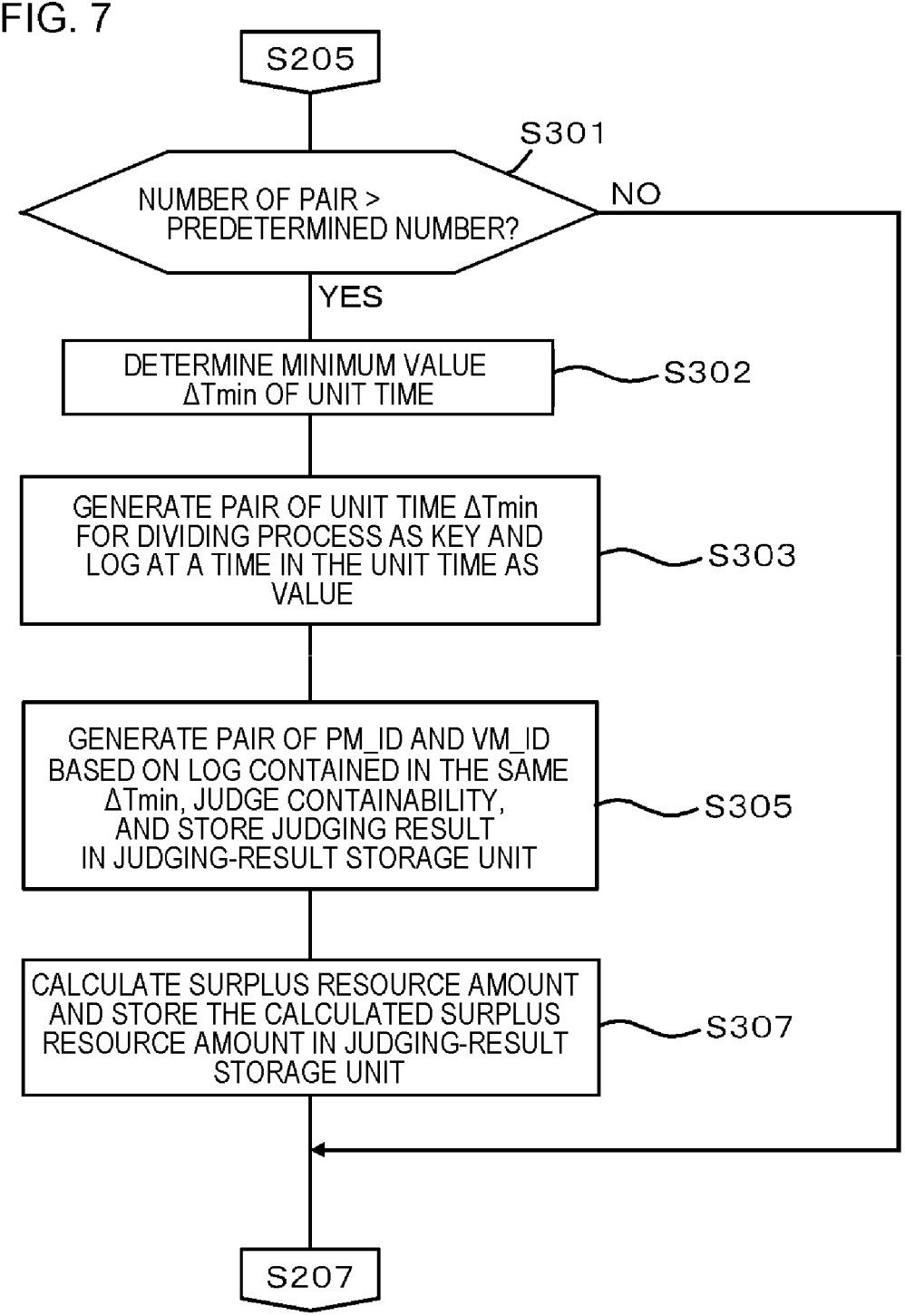
FIG. 7 is a flowchart showing an example of an operation of the server system according to the exemplary embodiment of the present invention.

FIG. 7 is a flowchart showing an example of an operation performed by the management device 300 in the server system 1 according to the exemplary embodiment of the present invention. Further, FIG. 8 is a diagram illustrating a table serving as an example of a data format treated in a series of processes in the server system 1.

It should be noted that the management device 300 according to this exemplary embodiment performs processes through a procedure similar to the flow chart showing the operation performed by the management device 200 according to the above-described exemplary embodiment illustrated in FIG. 4, and performs processes of step S301 to step S307 shown in FIG. 7 between step S205 and step S207 in FIG. 4. Below, a description will be made with reference to FIG. 4, and FIG. 6 to FIG. 8.

As with the management device 200 according to the above-described exemplary embodiment, the collection unit 102 in the management device 300 acquires the load data of each of the physical servers 10 through the communication network 3 at a constant interval, and store the acquired load data in the load-data storage unit 120 (step S201 in FIG. 4). The data format at this time is a data format as shown in step S201 in Table 2 shown in FIG. 8.

The generating unit 304 of the management device 300 refers to the load-data storage unit 120, and generates paired data each having an identifier (PM_ID) for each of the physical servers 10 and the collection time t as the key and the load data ("load_info_1(VM_ID+CPU+NW_send+..." in Table 2 in FIG. 8) as the value on the basis of each of the load data (step S203 in FIG. 4). The data format at this time is a data format as shown in step S203 in Table 2 shown in FIG. 8.

The generating unit 304 of the management device 300 refers to the load-data storage unit 120, and generates paired data having the unit of time ΔT for the dividing process as the key and the log ("load_info_2(list of PM_ID+t+load_info_1)" in Table 2 in FIG. 8) at the time t in the unit of time as the value (step S205 in FIG. 4). The data format at this time is a data format as shown in step S205 in Table 2 shown in FIG. 8. Then, processes of the management device 300 move to step S301 in FIG. 7.

The determining unit 302 of the management device 300 refers to the load-data storage unit 120, and judges whether or not the number of the pairs of data generated in step S205 is larger than a predetermined number (step S301 in FIG. 7). If the number of the pairs of the data exceeds the predetermined number (YES in step S301 in FIG. 7), the determining unit 302 of the management device 300 refers to the load-data storage unit 120, and determines the minimum value ΔTmin of the unit of time ΔT such that the number of the load data processed within the unit of time is less than the predetermined number (step S302 in FIG. 7). Note that, if the number of the pair of the data is less than the predetermined number (NO in step S301 in FIG. 7), then, the management device 300 returns the process to the flow shown in FIG. 4, and continues to perform the process in step S207 shown in FIG. 4.

Then, the generating unit 304 of the management device 300 refers to the load-data storage unit 120, and generates paired data having the minimum value ΔTmin of the unit of time ΔT as the key, and the log ("load_info_3(list of load_info_2)" in Table 2 in FIG. 8) at the time t in the unit of time as the value (step S303 in FIG. 7). The data format at this time is a data format as shown in step S303 in Table 2 shown in FIG. 8.

Then, the judging unit 104 of the management device 300 refers to the load-data storage unit 120, generates paired data having PM_ID and VM_ID on the basis of the log in the same ΔTmin, and judges the containability. Further, the judging unit 104 of the management device 300 stores the judging results (corresponding to "result_3(PM_ID, VM_ID, OK/NG)" in Table 2 shown in FIG. 8) in the judging-result storage unit 130 (step S305 in FIG. 7). Then, the calculating unit 204 of the management device 300 refers to the load-data storage unit 120, calculates a surplus resource amount (corresponding to "result_3(PM_ID, VM_ID, surplus resource)" in Table 2 shown in FIG. 8), and stores the calculated surplus resource amount in the judging-result storage unit 130 (step S307 in FIG. 7). The data format at this time is a data format as shown in step S305 and step S307 in Table 2 shown in FIG. 8. The management device 300 returns the process to the flow shown in FIG. 4, and continues to perform the process in step S207 shown in FIG. 4.

The judging unit 104 of the management device 300 refers to the judging-result storage unit 130, and judges the containability for all the ΔTmin in the ΔT. Further, the judging unit 104 of the management device 300 stores the judging results (corresponding to "result_2(PM_ID, VM_ID, OK/NG)" in Table 2 shown in FIG. 8) in the judging-result storage unit 130 (step S207 in FIG. 4). Then, the calculating unit 204 of the management device 300 refers to the judging-result storage unit 130, calculates a surplus resource amount (corresponding to "result_2(PM_ID, VM_ID, surplus resource)" in Table 2 shown in FIG. 8), and stores the surplus resource amount in the judging-result storage unit 130 (step S209 in FIG. 4). The data format at this time is a data format as shown in step S207 and step S209 in Table 2 shown in FIG. 8.

Then, the judging unit 104 of the management device 300 refers to the judging-result storage unit 130, and judges the containability for all the ΔT in the time span T. Further, the judging unit 104 of the management device 300 stores the judging results (corresponding to "result_1(OK/NG)" in Table 2 shown in FIG. 8) corresponding to the data of the pair of PM_ID and VM_ID in the judging-result storage unit 130 (step S211 in FIG. 4). The calculating unit 204 of the management device 300 refers to the judging-result storage unit 130, calculates a surplus resource (corresponding to "result_1 (surplus resource)" in Table 2 shown in FIG. 8) of the physical server 10 corresponding to the data of the pair of PM_ID and VM_ID, and stores the calculated surplus resource in the judging-result storage unit 130 (step S213 in FIG. 4). The data format at this time is a data format as shown in step S211 and step S213 in Table 2 shown in FIG. 8.

As described above, as in the previous exemplary embodiment, a searching request is received from an operator, and then, the operator is provided with the searching results, whereby it is possible to present the operator with the judging results of the containability stored in the judging-result storage unit 130 and concerning the case where the virtual servers 20 run on each of the physical servers 10.

This enables the operator to quickly select a physical server suitable as the migration destination of the virtual server 20. Further, the surplus resource amount is presented in a comparable manner, which makes it possible for the operator to quickly select a physical server 10 with less waste.

According to the server system 1 of this exemplary embodiment, it is possible to obtain a similar effect to that of the above-described exemplary embodiments, and to perform the parallel distributed processing with smaller granularity, by dividing the load data of the physical servers 10 and virtual servers 20 by the minimum value ΔTmin of the unit of time for the dividing process, and performing the judging processes of the containability. Thus, according to the present invention, it is possible to quickly select a physical server 10 suitable as the migration destination of the virtual server 20 even if the amount of the data significantly increases, and avoid occurrence of an insufficient capacity for the virtual server 20 or an excess available resource of the physical server 10.

Fourth Exemplary Embodiment

Figure 9:
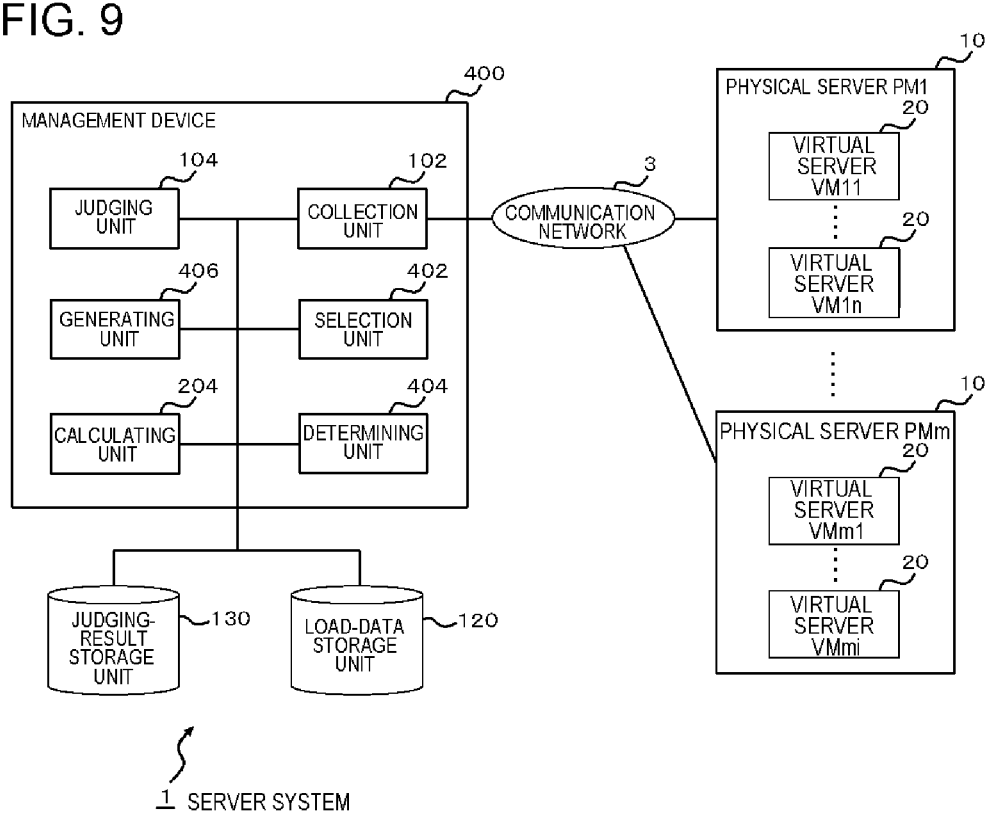
FIG. 9 is a functional block diagram illustrating a configuration of the server system according to the exemplary embodiment of the present invention.

FIG. 9 is a functional block diagram illustrating a configuration of a server system 1 according to an exemplary embodiment of the present invention.

A management device 400 in the server system 1 according to this exemplary embodiment is different from that in the previous exemplary embodiments in FIG. 3 and FIG. 6 in that servers having load data with a similar load pattern are grouped, and a representative server is selected from the group to perform the judging process, thereby reducing the load of the judging process.

The management device 400 in the server system 1 according to this exemplary embodiment is particularly effective for a system in which a grate large number of servers carry a similar load pattern. Further, the management device 400 is also effective for a system having a large number of servers each carrying light load that hardly changes.

In the server system 1 according to the exemplary embodiment of the present invention, the management device 400 further includes a selection unit 402 that categorizes the load data collected by the collection unit 102 into groups on the basis of the range of unit load, and selects a predetermined number of load data from each of the groups. Further, the judging unit 104 of the management device 400 performs a judging process on the basis of the selected load data.

It should be noted that, in this exemplary embodiment, a description will be made of an example in which the server system 1 includes a large number of physical servers 10 and virtual servers 20, and load data have a significantly large size (the number of load data serving as the monitoring target).

More specifically, the management device 400 according to this exemplary embodiment includes a generating unit 406 in place of the generating unit 202 in the management device 200 or generating unit 304 in the management device 300 in the previous exemplary embodiments in FIG. 3 or FIG. 6, and includes a collection unit 102, a judging unit 104, and a calculating unit 204 similar to those in the management device 200 and the management device 300, and includes a determining unit 404 in place of the determining unit 302 in the management device 300, and further includes a selection unit 402.

The selection unit 402 categorizes the load data collected by the collection unit 102 into groups on the basis of the range of the unit load, and selects a predetermined number of load data from each of the groups. As described later, the selection unit 402 may perform a selection process for the load data in the case where the number of the pairs of the load data of the physical servers 10 and the virtual servers 20 contained in the unit of time ΔT or the minimum value ΔTmin of the unit of time ΔT is larger than a predetermined number of pairs. Alternatively, the selection process may be performed in the case where the number of load data having a similar load pattern exceeds the predetermined number of data.

In this specification, the range of the unit load means, for example, a range of average load, a range of peak load, or a variation range of load of the physical servers 10 per unit of time. The selection unit 402 groups physical servers 10 having a predetermined range of average load, peak load, or variation of load, and selects a few representative servers from each of the groups.

The determining unit 404 determines the minimum value of the unit of time such that the number of load data processed within the unit of time is less than a predetermined number as with the determining unit 302 of the management device 300 illustrated in FIG. 6.

It should be noted that, although the management device 400 according to this exemplary embodiment includes the determining unit 404, the determining unit 404 is not always necessary, and the management device 400 may be formed such that a configuration for determining the minimum value of the unit value is not provided, as with the management device 200 illustrated in FIG. 3.

The generating unit 406 generates paired data each having an identifier (PM_ID) for each of the physical servers 10 and a collection time t as a key and load data as a value on the basis of the load data of the physical server 10 and the virtual servers 20 collected by the collection unit 102 from each of the physical servers 10 as with the generating unit 202 of the management device 200 in the previous exemplary embodiment illustrated in FIG. 3. Then, the generating unit 202 generates paired data having a unit of time ΔT for the dividing process as the key and the log at the time t in the unit of time as the value.

Further, the generating unit 406 generates paired data having the minimum value ΔTmin of the unit of time ΔT as the key and the log at the time t in the unit of time as the value in the case where the number of the pair of the generated data exceeds the predetermined number, as with the generating unit 304 of the management device 300 in the previous exemplary embodiment illustrated in FIG. 6.

Each of the data generated by the generating unit 406 can be stored in the load-data storage unit 120.

Described below are the operations performed by the management device 400 in the server system 1 according to this exemplary embodiment having the configuration as described above.

Figure 10:
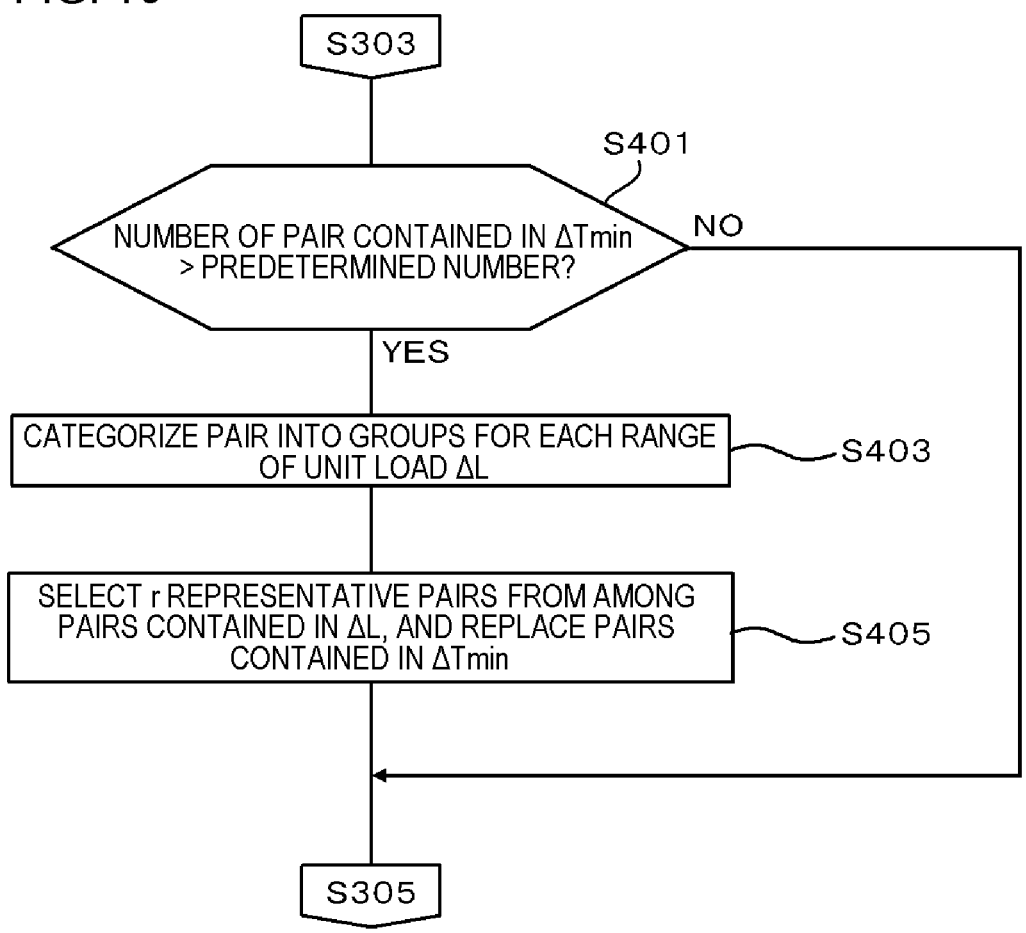
FIG. 10 is a flowchart showing an example of an operation of the server system according to the exemplary embodiment of the present invention.

FIG. 10 is a flowchart showing an example of an operation performed by the management device 400 in the server system 1 according to the exemplary embodiment of the present invention. Further, FIG. 11 is a diagram illustrating a table serving as an example of a data format treated in processes performed in the server system 1.

It should be noted that the management device 400 according to this exemplary embodiment performs processes through a procedure similar to the flow chart showing the operation performed by the management device 200 according to the previous exemplary embodiment illustrated in FIG. 4, performs processes of step S301 to step S307 shown in FIG. 7 between step S205 and step S207 shown in FIG. 4, and further performs processes of step S401 to step S405 shown in FIG. 10 between step S303 and step S305 shown in FIG. 7. Below, a description will be made with reference to FIG. 4, FIG. 7, and FIG. 9 to FIG. 11.

As with the management device 200 according to the previous exemplary embodiment, the collection unit 102 of the management device 400 acquires the load data of each of the physical servers 10 through the communication network 3 at a constant interval, and stores the acquired load data in the load-data storage unit 120 (step S201 in FIG. 4). The data format at this time is a data format as shown in step S201 in Table 3 shown in FIG. 11.

The generating unit 406 of the management device 400 refers to the load-data storage unit 120, and generates paired data having the identifier (PM_ID) of each of the physical servers 10 and the collection time t as the key and the load data ("load_info_1(VM_ID+CPU+NW_send+ . . . " in Table 3 shown in FIG. 11) as the value on the basis of each of the load data (step S203 in FIG. 4). The data format at this time is a data format as shown in step S203 in Table 3 shown in FIG. 11.

The generating unit 406 of the management device 400 refers to the load-data storage unit 120, and generates paired data having the unit of time ΔT for the dividing process as the key and the log ("load_info_2(list of PM_ID+t+load_info_1)" in Table 3 shown in FIG. 11) at the time t in the unit of time as the value (step S205 in FIG. 4). The data format at this time is a data format as shown in step S205 in Table 3 shown in FIG. 11. Then, in the management device 400, the processing is moved to step S301 shown in FIG. 7.

The determining unit 404 of the management device 400 refers to the load-data storage unit 120, and judges whether or not the number of the pairs of the data generated in step S205 is larger than the predetermined number (step S301 in FIG. 7). If the number of the pair of the data is larger (YES in step S301 in FIG. 7), the determining unit 404 of the management device 400 refers to the load-data storage unit 120, and determines the minimum value ΔTmin of the unit of time ΔT such that the number of the data processed within the unit of time is less than the predetermined number (step S302 in FIG. 7).

The generating unit 304 of the management device 400 refers to the load-data storage unit 120, and generates paired data having the minimum value ΔTmin of the unit of time ΔT as the key and the log ("load_info_3(list of load_info_2)" in Table 3 shown in FIG. 11) at the time t in the unit of time as the value (step S303 in FIG. 7). The data format at this time is a data format as shown in step S303 in Table 3 shown in FIG. 11. Then, in the management device 400, the processing is moved to step S401 shown in FIG. 10.

The selection unit 402 of the management device 400 refers to the load-data storage unit 120, and judges whether or not the number of the pair of the data generated in step S303 and contained in the ΔTmin is larger than a predetermined number (step S401 in FIG. 10). If the number of the pair of the data contained in the ΔTmin is larger than the predetermined number (YES in step S401 in FIG. 10), the selection unit 402 groups the pair of the data in terms of the range of the unit load ΔL (step S403 in FIG. 10). The data format at this time is a data format as shown in step S403 in Table 3 shown in FIG. 11. Note that, if the number of the pair of the data contained in the ΔTmin is less than the predetermined number (NO in step S401 shown in FIG. 10), the management device 400 returns processing to the flow shown in FIG. 7, and continues to perform the process of step S305 shown in FIG. 7.

Then, the selection unit 402 of the management device 400 refers to the load-data storage unit 120, selects r pairs corresponding to representative from among the pairs of the data contained in the ΔL, and replaces the pairs of the data contained in the ΔTmin with the selected pairs (step S405 in FIG. 10). The data format at this time is a data format as shown in step S405 in Table 3 shown in FIG. 11. Further, the management device 400 returns processing to the flow shown in FIG. 7, and continues to perform the process of step S305 shown in FIG. 7.

Then, the judging unit 104 of the management device 400 refers to the load-data storage unit 120, generates paired data having PM_ID and VM_ID on the basis of the log in the same ΔTmin, and judges the containability. The judging unit 104 of the management device 400 stores the judging results (corresponding to "result_3(PM_ID, VM_ID, OK/NG)" in Table 3 shown in FIG. 11) in the judging-result storage unit 130 (step S305 in FIG. 7). Further, the calculating unit 204 of the management device 400 refers to the load-data storage unit 120, calculates a surplus resource amount (corresponding to "result_3(PM_ID, VM_ID, surplus resource)" in Table 3 shown in FIG. 11), and stores the calculated surplus resource amount in the judging-result storage unit 130 (step S307 in FIG. 7). The data format at this time is a data format as shown in step S305 and step S307 in Table 3 shown in FIG. 11. Then, in the management device 400, the processing is returned to the flow shown in FIG. 4, and continues the process in step S207 shown in FIG. 4.

The judging unit 104 of the management device 400 refers to the judging-result storage unit 130, and judges the containability for all the ΔTmin contained in the ΔT. The judging unit 104 of the management device 400 stores the judging results (corresponding to "result_3(PM_ID, VM_ID, OK/NG)" in Table 2 shown in FIG. 8) in the judging-result storage unit 130 (step S207 in FIG. 4). Further, the calculating unit 204 of the management device 400 refers to the judging-result storage unit 130, calculates a surplus resource amount (corresponding to "result_2(PM_ID, VM_ID, surplus resource)" in Table 3 shown in FIG. 11), and stores the surplus resource amount in the judging-result storage unit 130 (step S209 in FIG. 4). The data format at this time is a data format as shown in step S207 and step S209 in Table 3 shown in FIG. 11.

Then, the judging unit 104 of the management device 400 refers to the judging-result storage unit 130, and judges the containability for all the ΔT contained in the time span T. Further, the judging unit 104 of the management device 400 stores the judging results (corresponding to "result_1(OK/NG)" in Table 3 shown in FIG. 11) corresponding to the paired data having PM_ID and VM_ID in the judging-result storage unit 130 (step S211 in FIG. 4). Then, the calculating unit 204 of the management device 400 refers to the judging-result storage unit 130, calculates a surplus resource ("result_1(surplus resource)" in Table 3 shown in FIG. 11) of the physical server 10 corresponding to the paired data having PM_ID and VM_ID, and stores the thus obtained surplus resource in the judging-result storage unit 130 (step S213 in FIG. 4). The data format at this time is a data format as shown in step S211 and step S213 in Table 3 shown in FIG. 11.

As described above, it is possible to present an operator with the judging results of the containability stored in the judging-result storage unit 130 and concerning the case where the virtual servers 20 run on each of the physical servers 10, by receiving a searching request from the operator and providing the operator with the searching results, as in the previous exemplary embodiments.

This enables the operator to quickly select a physical server 10 suitable as the migration destination of the virtual server 20. Further, the surplus resource amount is presented in a comparable manner, which makes it possible for the operator to select a physical server 10 with less waste.

According to the server system 1 of this exemplary embodiment, it is possible to obtain a similar effect to that of the above-described exemplary embodiments, and to perform the parallel distributed processing in a finer manner with a reduced number of combinations, by dividing the load data of the physical servers 10 or virtual servers 20 by the minimum value ΔTmin of the unit of time for the dividing process, narrowing down the representative values for each of the ranges of the unit load ΔL, and performing the judging process of the containability. Thus, according to the present invention, it is possible to select a physical server 10 suitable as the migration destination of the virtual server 20 for a short period of time even if the amount of the data significantly increases, and avoid occurrence of the insufficient capacity for the virtual server 20 or excess available resource of the physical server 10.

These are descriptions of the exemplary embodiments of the present invention with reference to the drawings. However, these are merely examples of the present invention, and it may be possible to employ various configuration other than those described above.

For example, in the server system 1 in another exemplary embodiment according to the present invention, the judging process for the containability performed by the judging unit of the management device may include judging in the following manners. The first judging method is a method in which emphasis is placed on safety, and judgment is made as to whether or not the available resource capacity satisfies the required resource amount over the entire period of time. This judging method is for online processing. In the second judging method, judgment is made as to whether or not the average of the available resource capacity satisfies the required resource capacity. In this second judging method, the resource amount may temporarily reach the upper limit. This second judging method is suitable for a system in which processes only need to be completed within a predetermined period of time (within a cycle) (for example, within 24 hours), and is for batch processing.

It may be possible to use the two judging methods either alone or in combination depending on operator's needs.

More specifically, with the first judging method, the judging unit of the management device in the server system 1 according to another exemplary embodiment performs the judging process, by judging whether or not the available resource capacity satisfies the requirements throughout a predetermined period of time in which load peaks of the load data periodically appear. If the requirements are satisfied, the judging unit judges that the containability exists.

Further, with the second judging method, the judging unit of the management device in the server system 1 according to another exemplary embodiment performs the judging process, by judging whether or not the average value of the available resource capacity satisfies the requirements for the average value throughout a predetermined period of time in which load peaks of the load data periodically appear. If the requirements are satisfied, the judging unit judges that the containability exists.

Further, in the server system 1 according to another exemplary embodiment, the management device may further include a resource presenting unit (not illustrated) that presents a user with a calculated surplus resource amount. Further, the management device may further include a judging-result presenting unit (not illustrated) that presents the user with the judging results obtained by the judging unit of the management device.

FIG. 12 is a diagram illustrating an example of a screen displayed on the display device (not illustrated) by the resource presenting unit in the server system 1 according to an exemplary embodiment of the present invention.

As illustrated in FIG. 12, a screen 500 contains a list 502 including a surplus resource 516 such as a CPU, a memory and a network for each paired data having a virtual server 512 (VM) and a destination physical server 514 (PM). In the list 502, the data can be sorted based on the increasing order of the surplus resource amount of a resource selected by an operator using an operation unit (not illustrated) from among the CPU, the memory and the network in a resource selection list 518. The operator refers to this list 502, which makes it possible for the operator to compare the surplus resource amounts of a physical server at the time when a virtual server is migrated.

It should be noted that, in this example, the list 502 only contains data judged to be "OK" in the judging of the containability. In the other examples, it may be possible to contain a list of all the pairs of the physical server 10 and the virtual server 20. In this case, it is desirable to display, in the list 502, information (such as "OK" and "NG") indicating the judging results for the containability.

Further, the list 502 may have, for each pair of the virtual servers 512 and the destination physical server 514, a migration button 520 that receives an order to migrate the virtual server 512 to the destination physical server 514. The operator can refer to the list 502, and select a pair of the physical server 10 and the virtual server 20 with the migration button 520. Further, an order to perform the migration can be received with an OK button 522. With the OK button 522 operated by the operator, it is possible to receive an order to migrate the virtual server 512 to the destination physical server 514 for the pair of the physical server 10 and the virtual server 20 selected with the migration button 520 in the list 502. Further, by referring to the list 502, the screen 500 may be closed or selection with the migration button 520 may be cancelled by operating a cancel button 524 in the case where the operator decides that migration is not necessary.

The management device 100 may further include a migration unit that, when an order to migrate a virtual server to a physical server is received, migrates the ordered virtual server to the ordered physical server. Alternatively, the order for migration may be received by other management device or physical server.

These are descriptions of the present invention with reference to the exemplary embodiments. However, the present invention is not limited to the exemplary embodiments. Configurations or details of the present invention may be variously changed within the scope of the present invention to the extent that a skilled person in the art can understand.

The present invention may include the following modes.

[Supplementary Note 1]

A management device connected through a communication network to plural physical servers on which plural virtual servers run, the management device including:

a judging unit that divides a process of judging whether or not an available resource capacity of the physical servers in a case where the virtual servers run on the physical servers a predetermined condition, into plural processes for every predetermined unit of time, and performs the processes of judging through parallel distributed processing; and a collection unit that collects, through the communication network, load data of the plural virtual servers and the plural physical servers, each of which performs a predetermined process, in which the judging unit performs the processes of judging on the basis of the load data collected by the collection unit.

[Supplementary Note 2]

The management device according to Supplementary Note 1, further including:

a determining unit that determines the minimum value of the unit of time such that the load data processed within the unit of time is less than a predetermined value, in which the judging unit divides the unit of time to be the determined minimum value, and performs the processes of judging for every the minimum value of the unit of time.

[Supplementary Note 3]

The management device according to Supplementary Note 1 or Supplementary Note 2, further including a selection unit that categorizes the load data collected by the collection unit into groups on the basis of a range of a unit load, and selects a predetermined number of load data from each of the groups, in which the judging unit performs the processes of judging on the basis of the selected load data.

[Supplementary Note 4]

The management device according to any one of Supplementary Note 1 to Supplementary Note 3, in which the judging unit of the management device performs the process of judging by judging whether or not the available resource capacity satisfies a required condition throughout a predetermined period of time in which a load peak of the load data periodically appears.

[Supplementary Note 5]

The management device according to any one of Supplementary Note 1 to Supplementary Note 4, in which the judging unit of the management device performs the process of judging, by judging whether or not an average value of the available resource capacity within a predetermined period of time in which a load peak of the load data periodically appears satisfies a required condition for the average value.

[Supplementary Note 6]

The management device according to any one of Supplementary Note 1 to Supplementary Note 5, further including a calculating unit that calculates a surplus resource amount of the physical server on the basis of the load data, and a resource presenting unit that presents a user with the calculated surplus resource amount.

[Supplementary Note 7]

The management device according to any one of Supplementary Note 1 to Supplementary Note 6, further including a judging-result presenting unit that presents a user with the judging result obtained by the judging unit of the management device.

[Supplementary Note 8]

A method for managing a server performed by a management device connected through a communication network to plural physical servers on which plural virtual servers run and managing the virtual servers running on the physical servers, the method including:

dividing a process of judging whether or not an available resource capacity of the physical servers, in a case where the virtual servers run on the physical servers, satisfies a predetermined condition, into plural processes for every predetermined unit of time, and performing the processes of judging through parallel distributed processing, and collecting, through the communication network, load data of the plural virtual servers and the plural physical servers, each of which performs a predetermined process, in which the processes of judging are performed on the basis of the collected load data.

[Supplementary Note 9]

The method for managing the server according to Supplementary Note 8, wherein the management device:

determines the minimum value of the unit of time such that the load data processed within the unit of time is less than a predetermined value, and divides the unit of time to be the determined minimum value, and performs the process of judging with the minimum value of the unit of time.

[Supplementary Note 10]

The method for managing the server according to Supplementary Note 8 or Supplementary Note 9, in which the management device:

categorizes the collected load data into groups on the basis of a range of a unit load, and selects a predetermined number of load data from each of the groups, and performs the process of judging on the basis of the selected load data.

[Supplementary Note 11]

The method for managing the server according to any one of Supplementary Note 8 to Supplementary Note 10, in which the management device performs the process of judging, by judging whether or not the available resource capacity satisfies a required condition throughout a predetermined period of time in which a load peak of the load data periodically appears.

[Supplementary Note 12]

The method for managing the server according to any one of Supplementary Note 8 to Supplementary Note 11, in which the management device performs the process of judging, by judging whether or not an average value of the available resource capacity within a predetermined period of time in which a load peak of the load data periodically appears satisfies a required condition for the average value.

[Supplementary Note 13]

The method for managing the server according to any one of Supplementary Note 8 to Supplementary Note 12, in which the management device calculates a surplus resource amount of the physical server on the basis of the load data, and presents a user with the calculated surplus resource amount.

[Supplementary Note 14]

The method for managing the server according to any one of Supplementary Note 8 to Supplementary Note 13, wherein the management device presents a user with the judging result.

[Supplementary Note 15]

A server system including plural physical servers on which plural virtual servers run, and a management device connected through a communication network to the plural physical servers and managing the virtual servers running on the physical servers, the management device including:

a judging unit that divides a process of judging whether or not an available resource capacity, in a case where the virtual servers run on the physical servers, satisfies a predetermined condition, into plural processes for every predetermined unit of time, and performs the processes of judging through parallel distributed processing, and a judging-result presenting unit that presents a user with the judging result obtained by the judging unit of the management device.

This application is based upon and claims the benefit of priority from Japanese Patent Application No. 2010-227824 filed on Oct. 7, 2010, the disclosure of which is incorporated herein in its entirety by reference.

What is claimed is:

1. A server system comprising:
a plurality of physical servers, each of said plurality of physical servers making a plurality of virtual servers run or operate thereon; and
a management device which is connected through a communication network to said plurality of physical servers and manages said virtual servers running on said physical servers,
said management device comprising:
a judging unit that performs a judging process of judging whether or not an available resource capacity satisfies a predetermined condition, in a case where said virtual servers run on said physical servers; and
a collection unit that collects, every collection time in a predetermined time span, through said communication network, plural sets of load data concerning said plurality of virtual servers and said plurality of physical servers,
said plurality of virtual servers and said plurality of physical servers performing at least a predetermined process, and
said load data of said plurality of physical servers and said plurality of virtual servers having a load peak which periodically appears every said predetermined time span, when said plurality of virtual servers and said plurality of physical servers perform said predetermined process,
said time span being divided into a plurality of predetermined units of time, said load data in said time span being divided into a plurality of data sets respectively corresponding to said units of time,
wherein said judging unit of said management device has a plurality of processing units, the processing units respectively performing said judging processes on the data sets of said load data of the physical servers and virtual servers respectively corresponding to said units of time, each of said processing units performing said judging process on a whole of a plurality of data sets of said load data collected from said plurality of physical servers at same collection times within a unit of time, said processing units preforming said judging processes in parallel, thereby performing a plurality of said judging processes through parallel distributed processing.

2. The server system according to claim 1, wherein
said management device further comprises
a determining unit that determines a minimum value of said unit of time such that the number of sets of said load data processed within said unit of time is less than a predetermined value, and
said judging unit of said management device performs said judging processes for every said unit of time, said time span being divided into said plurality of units of time each having said determined minimum value.

3. The server system according to claim 1, wherein
said management device further comprises
a selection unit that categorizes said load data collected by said collection unit into groups on the basis of a range of a unit load, and selects a predetermined number of load data from each of said groups, wherein
said judging unit of said management device performs said judging processes on the basis of the selected load data.

4. The server system according to claim 1, wherein
said judging unit of said management device performs said judging processes, by judging whether or not an available resource capacity satisfies a required condition throughout said a predetermined time span.

5. The server system according to claim 1, wherein
said judging unit of said management device performs said judging processes, by judging whether or not an average value of said available resource capacity within said a predetermined time span satisfies a required condition for said average value.

6. The server system according to claim 1, wherein
said management device further comprises:
a calculating unit that calculates a surplus resource amount of said physical servers on the basis of said load data, and
a resource presenting unit that presents a user with the calculated surplus resource amount.

7. A management device connected through a communication network to a plurality of physical servers that each make a plurality of virtual servers run or operate thereon, comprising:
a judging unit that performs a judging process of judging whether or not an available resource capacity satisfies a predetermined condition;
a collection unit that collects, every collection time in a predetermined time span, through said communication network, plural sets of load data concerning said plurality of virtual servers and said plurality of physical servers,
said plurality of virtual servers and said plurality of physical servers performing at least a predetermined process, and
said load data of said plurality of physical servers and said plurality of virtual servers having a load peak which periodically appears every said predetermined time span, when said plurality of virtual servers and said plurality of physical servers perform said predetermined process,
said time span being divided into a plurality of predetermined units of time, said load data in said time span being divided into a plurality of data sets respectively corresponding to said units of time, wherein said judging unit of said management device has a plurality of processing units, the processing units respectively performing said judging processes on the data sets of said load data of the physical servers and virtual servers respectively corresponding to said units of time, each of said processing units performing said judging process on a whole of a plurality of data sets of said load data collected from said plurality of physical servers at same collection times within a unit of time, said processing units preforming said judging processes in parallel, thereby performing a plurality of said judging processes through parallel distributed processing.

8. A method for managing a server performed by a management device connected through a communication network to a plurality of physical servers that each make a plurality of virtual servers run or operate thereon, the management device managing said virtual servers running on said physical servers, said method including:

performing a judging process of judging whether or not an available resource capacity satisfies a predetermined condition, in a case where said virtual servers run on said physical servers;

collecting, every collection time in a predetermined time span, through said communication network, plural sets of load data concerning said plurality of virtual servers and said plurality of physical servers, said plurality of virtual servers and said plurality of physical servers performing at least a predetermined process, and said load data of said plurality of physical servers and said plurality of virtual servers having a load peak which periodically appears every said predetermined time span, when said plurality of virtual servers and said plurality of physical servers perform said predetermined process, said time span being divided into a plurality of predetermined units of time, said load data in said time span being divided into a plurality of data sets respectively corresponding to said units of time, wherein said judging process has a plurality of processing processes, the processing processes respectively performing said judging processes on the data sets of said load data of the physical servers and virtual servers respectively corresponding to said units of time, each of said processing processes performing said judging process on a whole of a plurality of data sets of said load data collected from said plurality of physical servers at same collection times within a unit of time, said processing process preforming said judging processes in parallel, thereby performing a plurality of said judging processes through parallel distributed processing.

9. A computer program product comprising a non-transitory computer-readable storage medium storing a program for causing a processing unit of a computer to execute operations comprising:

a process that realizes a management device connected through a communication network to a plurality of physical servers that each make a plurality of virtual servers run and managing said virtual servers run on said physical servers, a procedure of the management device for performing a judging process of judging whether or not an available resource capacity satisfies a predetermined condition, in a case where said virtual servers run on said physical servers;

performing said judging processes through parallel distributed processing;

a procedure of the management device for performing a collecting process of collecting, every collection time in a predetermined time span, through said communication network, plural sets of load data concerning said plurality of virtual servers and said plurality of physical servers, said plurality of virtual servers and said plurality of physical servers performing at least a predetermined process, and said load data of said plurality of physical servers and said plurality of virtual servers having a load peak which periodically appears every said predetermined time span, when said plurality of virtual servers and said plurality of physical servers perform said predetermined process, said time span being divided into a plurality of predetermined units of time, said load data in said time span being divided into a plurality of data sets respectively corresponding to said units of time, wherein said judging process has a plurality of processing processes, the processing processes respectively performing said judging processes on the data sets of said load data of the physical servers and virtual servers respectively corresponding to said units of time, each of said processing processes performing said judging process on a whole of a plurality of data sets of said load data collected from said plurality of physical servers at same collection times within a unit of time, said processing process preforming said judging processes in parallel, thereby performing a plurality of said judging processes through parallel distributed processing.

* * * * *